United States Patent Office.

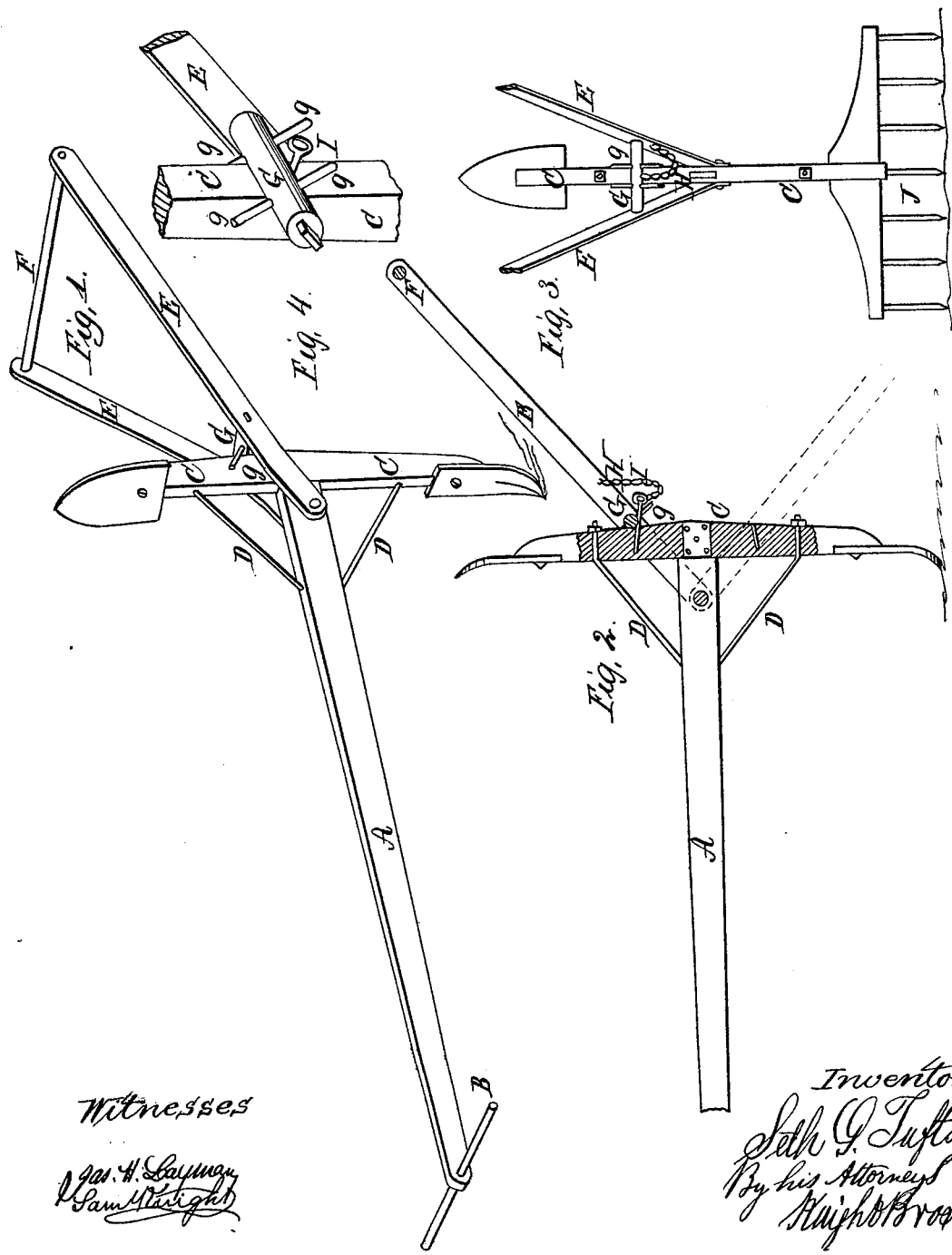

SETH G. TUFTS, OF MAINEVILLE, OHIO.

*Letters Patent No. 91,497, dated June 15, 1869.*

IMPROVEMENT IN REVERSIBLE CULTIVATOR.

The Schedule referred to in these Letters Patent and making part of the same.

*To whom it may concern:*

Be it known that I, SETH G. TUFTS, of Maineville, Warren county, Ohio, have invented a new and useful Reversible Cultivator; and I hereby declare the following to be a full, clear, and exact description thereof, reference being had to the accompanying drawings, making part of this specification.

My invention relates to a cultivator whose standard or sheth is double-ended, and armed, at its ends, with plows varying in size, or with a plow and a rake, or other suitable blade or share, for working the ground, or for collection of material thereupon.

In the drawings—

Figure 1 is a perspective view of a hand-cultivator embodying my improvements.

Figure 2 is a side elevation, partially in section.

Figure 3 is a rear elevation of a portion of the implement.

Figure 4 is a perspective view of the devices for holding the handles in their operating position.

A is a beam, having, at the front end, a hand-bar, B, and which, at its rear end, is mortised into the two-ended sheth C, to which it is also connected by a brace-rod, D, which passes through the beam and the sheth, to the latter of which its ends are secured in the usual manner.

Pivoted to the beam, at a point near to its rear end, are the handles E, having a spreader, F, which forms a handle to direct the instrument, as it is drawn forward, by another person, by means of the bar B, or by an animal properly hitched to the beam.

The stilts or handles E are connected together, near to their lower ends, by a cross-bar, G, having projecting cheeks, g, and a chain, H, to whose free end is attached a bolt, I.

When in use, the cross-bar G rests against the rear of the sheth, at the opposite end to that brought into service, and the cheeks g prevent any side movement, the handles, at the same time, being sustained by the bolt I, which passes beneath the cross-bar G, and enters the sheth.

Any other fastening may be substituted for the bolt. For instance, a spring catch might be made to answer the purpose.

When it is desired to reverse the ends of the sheth, the bolt G is withdrawn, and the handles swing around so as to reverse their position, and secured to the opposite end of the sheth, in the manner before stated.

On removing one of the shares, a rake, J, or any other tool, may be secured in its place.

I claim herein as new, and of my invention—

1. The provision, in a hand or other cultivator, of the double-ended sheth or standard C, substantially as and for the purposes designated.

2. In combination with a double-ended sheth, the reversible handle E, substantially as set forth.

3. The cross-bar G, cheeks g, and bolt I, or their equivalents, in the described combination with the reversible handle E.

In testimony of which invention, I hereunto set my hand.

SETH G. TUFTS.

Witnesses:
GEO. H. KNIGHT,
JAMES H. LAYMAN.